United States Patent
Sezginer et al.

[11] Patent Number: 5,977,768
[45] Date of Patent: Nov. 2, 1999

[54] NUCLEAR MAGNETIC RESONANCE LOGGING WITH AZIMUTHAL RESOLUTION

[75] Inventors: Abdurrahman Sezginer, Houston; Shu-Kong Chang, Sugar Land, both of Tex.

[73] Assignee: Schlumberger Technology Corporation, Ridgefield, Conn.

[21] Appl. No.: 08/880,343

[22] Filed: Jun. 23, 1997

[51] Int. Cl.⁶ .......................................... G01V 3/00
[52] U.S. Cl. ..................... 324/303; 324/300; 324/307; 324/309
[58] Field of Search .................... 324/303, 300, 324/307, 309

[56] References Cited

U.S. PATENT DOCUMENTS

| | | | |
|---|---|---|---|
| 3,617,867 | 11/1971 | Herzog | 324/0.5 |
| 4,350,955 | 9/1982 | Jackson et al. | 324/303 |
| 4,717,876 | 1/1988 | Masi et al. | 324/303 |
| 4,933,638 | 6/1990 | Kenyon et al. | 324/303 |
| 5,023,551 | 6/1991 | Kleinberg et al. | 324/303 |
| 5,055,787 | 10/1991 | Kleinberg et al. | 324/303 |
| 5,055,788 | 10/1991 | Kleinberg et al. | 324/303 |
| 5,091,644 | 2/1992 | Minette | 250/254 |
| 5,230,386 | 7/1993 | Wu et al. | 175/45 |
| 5,241,273 | 8/1993 | Luling | 324/338 |
| 5,280,243 | 1/1994 | Miller | 324/303 |
| 5,363,041 | 11/1994 | Sezginer | 324/303 |
| 5,376,884 | 12/1994 | Sezginer | 324/303 |
| 5,389,877 | 2/1995 | Sezginer et al. | 324/303 |
| 5,397,893 | 3/1995 | Minette | 250/254 |
| 5,473,158 | 12/1995 | Holenka et al. | 250/254 |
| 5,513,528 | 5/1996 | Holenka et al. | 73/151 |
| 5,557,201 | 9/1996 | Kleinberg et al. | 324/303 |

FOREIGN PATENT DOCUMENTS

0 581 666 A2  2/1994  European Pat. Off. .
2 310 500  8/1997  United Kingdom .

*Primary Examiner*—Christine K. Oda
*Assistant Examiner*—Bmz B. Shrivastav
*Attorney, Agent, or Firm*—Martin M. Novack; Keith G. W. Smith; William B. Batzer

[57] ABSTRACT

Apparatus and method are disclosed for determining a nuclear magnetic resonance property of formations surrounding a borehole while drilling the borehole with a rotating drill bit on a drill string. An embodiment of the method includes the following steps: providing a logging device in the drill string, the logging device being rotatable with the drill string or a portion of the drill string, the logging device having a rotational axis; producing a static magnetic field and an RF magnetic field at the logging device, the static and RF magnetic fields having mutually orthogonal components in an investigation region in the formations surrounding the logging device, the magnitudes of the static and RF magnetic fields in the investigation region being substantially rotationally invariant as the logging device rotates around its axis; receiving nuclear magnetic resonance spin echoes at at least one circumferential sector on the logging device; and determining a nuclear magnetic resonance property of the formations, for different portions of the investigation region, from the received nuclear magnetic resonance spin echoes.

51 Claims, 10 Drawing Sheets

NUCLEAR MAGNETIC RESONANCE LOGGING WITH AZIMUTHAL RESOLUTION

FIELD OF THE INVENTION

This invention relates to the field of well logging and, more particularly, to an apparatus and method for determining nuclear magnetic resonance logging characteristics of earth formations surrounding a borehole, either during or after the drilling of the borehole.

BACKGROUND OF THE INVENTION

In the evaluation of earth boreholes drilled in earth formations to produce hydrocarbons, determination of the porosity of the formations is considered essential for decision making. Nuclear magnetic resonance ("NMR") provides a means of measuring total and producible porosity of earth formations. In certain conditions NMR well logging can provide important information on the pore size of formation rock and on the type of fluid contained therein. Measurement of nuclear resonance requires a static magnetic field $\overline{B}_0$ and a radio frequency (RF) magnetic field in the earth formation that is being probed. [As used herein, an RF field generally has a frequency in the range 2 KHz to 10 MHz.] Subatomic particles with a nonzero magnetic moment and spin angular momentum precess about the static field $\overline{B}_0$ with an angular frequency $\omega_0 = \gamma B_0$ when perturbed from their thermal equilibrium. The constant $\gamma$ is the gyromagnetic ratio of the resonating particle, most commonly the hydrogen nucleus. For hydrogen nuclei, the gyromagnetic ratio is $2.675198775 \times 10^8$ radian/second/Tesla. To manipulate the spin state of the particles, for example, to perturb the thermal equilibrium, a radio frequency (RF) magnetic field $\overline{B}_1$ is needed. The frequency of the RF field $\overline{B}_1$ should be close to $\omega_0$ and substantially perpendicular to the static field $\overline{B}_0$ in the region of investigation. Magnetic resonance is observed by detecting the oscillating magnetic field produced by the precession of the spins. Typically, but not necessarily, the same coil that produces the RF field $\overline{B}_1$ is used for detection. In pulse-NMR, repeated pulses are applied to the coil and spin-echoes are detected in between the transmitted pulses. Reference can be made, for example, to U.S. Pat. Nos. 5,376,884, 5,055,788, 5,055,787, 5,023,551, 4,933,638, and 4,350,955 with regard to known nuclear magnetic resonance logging techniques.

In logging-while-drilling, the measurement apparatus is mounted on a drill collar. Drill collars are long, tubular pieces of a strong material, typically nonmagnetic stainless-steel. Drill collars and drill pipes transmit the torque from the surface apparatus to the drill bit. During drilling, the drill collars typically rotate about their axes, which are substantially aligned with the axis of the borehole. The rates of rotation of the drill collars and the drill bit are the same in rotary drilling, and can be different if a downhole mud motor is used. In either case, the drill collar is subject to rotation. For NMR logging, the magnitudes of $\overline{B}_0$, $\overline{B}_1$, and the angle between them should be substantially invariant of the rotation angle in the region of investigation. This does not preclude the possibility that the directions of $\overline{B}_0$ and $\overline{B}_1$ may depend on the rotation angle. The foregoing invariance is required because magnetic resonance measurements take on the order of 0.01 to 1 seconds during which the drill collar may rotate by a substantial angle. Consistent preparation and measurement of spin states are not possible without the rotational invariance.

Directional drilling involves the drilling of a well bore along a deviated course in order to reach a target region at a particular vertical and horizontal distance from the original surface location. Directional drilling is employed, for example, to obtain an appropriate well bore trajectory into an oil producing formation bed (or "pay zone") and then drill substantially within the pay zone. A horizontally drilled well can greatly increase the borehole volume in the pay zone with attendant increase in oil production. Recent advances in directional drilling equipment and techniques have greatly improved the accuracy with which drilling paths can be directed.

Nuclear magnetic resonance logging systems have previously been proposed for logging-while-drilling application. If an NMR logging device of a logging-while-drilling system has an axially symmetric response, the NMR characteristics measured by the logging device will tend to average the signals received circumferentially from the formations. For example, when drilling a near-horizontal well along the boundary between two formation beds with dissimilar producible porosities, such a logging device would give indication of an intermediate porosity. It would be very advantageous, although it is not presently possible, to be able to use NMR to better delineate the presence, locations, and characteristics of the formation beds in this type of a situation.

It is among the objects of the present invention to address limitations of the prior art with regard to nuclear magnetic resonance logging techniques and apparatus.

SUMMARY OF THE INVENTION

The present invention provides the capability of azimuthally resolved nuclear magnetic resonance logging. The invention can be used in so-called wireline logging, but is particularly advantageous in achieving azimuthally resolved NMR logging-while-drilling.

A form of the invention is directed to an apparatus and method for determining a nuclear magnetic resonance property of formations surrounding a borehole while drilling the borehole with a rotating drill bit on a drill string. An embodiment of the method of the invention includes the following steps: providing a logging device in the drill string, the logging device being rotatable with the drill string or a portion of the drill string, the logging device having a rotational axis; producing a static magnetic field and an RF magnetic field at the logging device, the static and RF magnetic fields having mutually orthogonal components in an investigation region in the formations surrounding the logging device, the magnitudes of the static and RF magnetic fields in the investigation region being substantially rotationally invariant as the logging device rotates around its axis; receiving nuclear magnetic resonance spin echoes at at least one circumferential sector on the logging device; and determining a nuclear magnetic resonance property of the formations, for different portions of the investigation region, from the received nuclear magnetic resonance spin echoes. [It will be understood that the static and RF magnetic fields are defined as having "mutually orthogonal components" if they are not parallel. Typically, but not necessarily, the static and RF magnetic fields will be close to mutually orthogonal in the investigation region.]

In a form of the invention, the receiving of nuclear magnetic resonance spin echoes is implemented at a plurality of different circumferential sectors on the logging device and comprises providing a plurality of arcuate receiver segments around the logging device and detecting nuclear magnetic resonance spin echoes in signals received by the individual receiver segments. In a disclosed embodiment of this form of the invention, the plurality of arcuate receiver segments comprises four arcuate segments, each of the segments being approximately a quadrant of the circumference of the logging device.

In another form of the invention, a plurality of axially oriented antenna components are respectively located in axially oriented slots in a logging device.

Further features and advantages of the invention will become more readily apparent from the following detailed description when taken in conjunction with the accompanying drawings.

DETAILED DESCRIPTION

Figure 1:
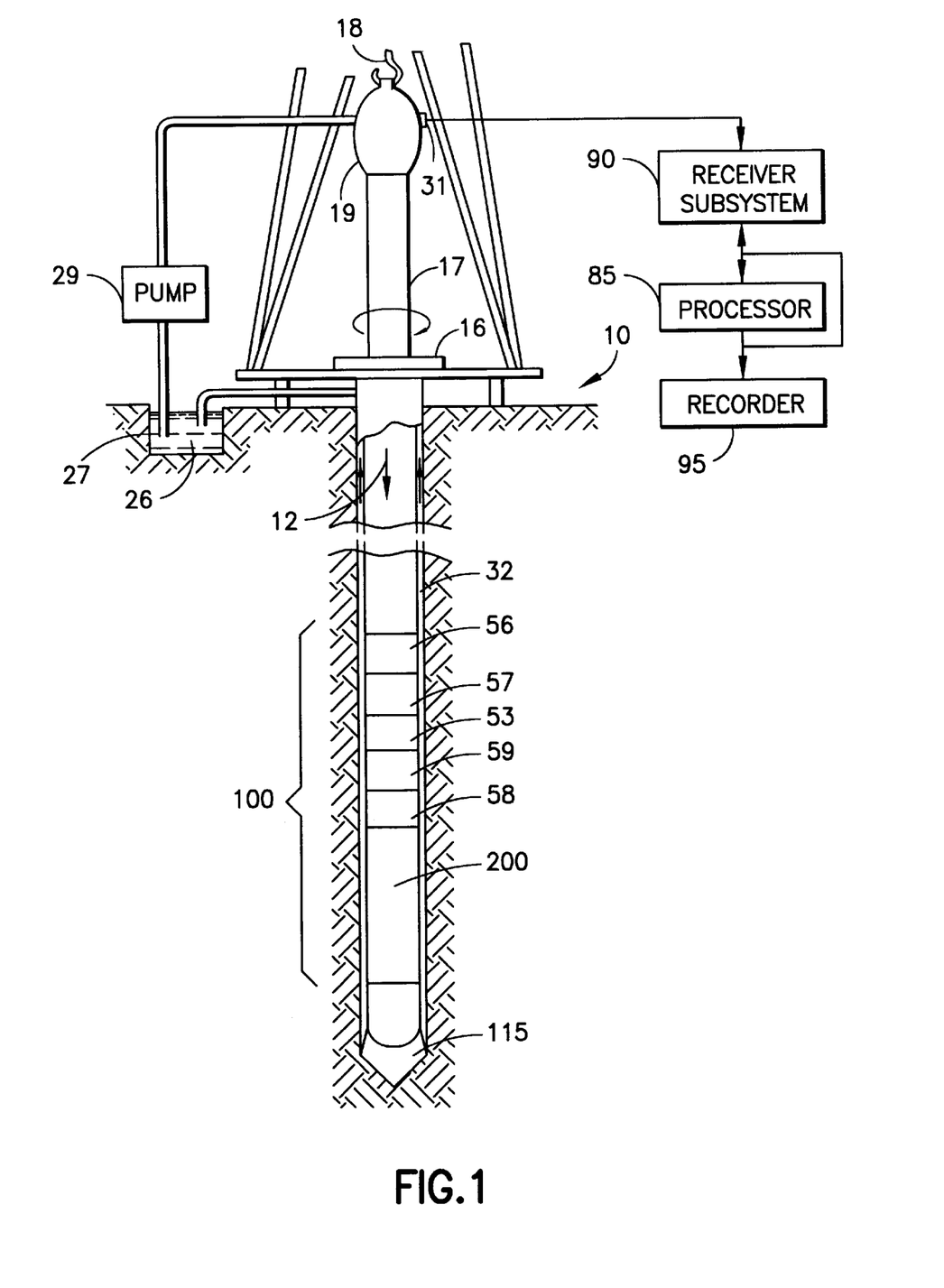
FIG. 1 is a diagram of a logging-while-drilling system in which an embodiment of the invention can be utilized and which can be used in practicing the method of the invention.

Referring to FIG. 1, there is illustrated an embodiment of the invention in the form of a logging-while-drilling apparatus and method. A platform and derrick 10 are positioned over a borehole 32 that is formed in the earth by rotary drilling. A drill string 12 is suspended within the borehole and includes a drill bit 115 at its lower end. The drill string 12, and the drill bit 115 attached thereto, is rotated by a rotating table 16 (energized by means not shown) which engages a kelly 17 at the upper end of the drill string. The drill string is suspended from a hook 18 attached to a travelling block (not shown). The kelly is connected to the hook through a rotary swivel 19 which permits rotation of the drill string relative to the hook. Alternatively, the drill string may be rotated from the surface by a "top drive" type of drilling rig. Drilling fluid or mud 26 is contained in a pit 27 in the earth. A pump 29 pumps the drilling fluid into the drill string 12 via a port in the swivel 19 to flow downward through the center of drill string 12. The drilling fluid exits the drill string via ports in the drill bit 115 and then circulates upward in the region between the outside of the drill string and the periphery of the borehole. As is well known, the drilling fluid thereby carries formation cuttings to the surface of the earth, and the drilling fluid is returned to the pit 27 for recirculation. The small arrows in the Figure illustrate the typical direction of flow of the drilling fluid.

Mounted within the drill string 12, preferably near the drill bit 115, is a downhole sensing, processing, storing and transmitting subsystem 100. Subsystem 100 includes a measuring apparatus 200 in accordance with an embodiment of the invention, and which is illustrated in FIGS. 2–6. Also provided in the downhole subsystem is a device or tool 59, of a type known in the art, for measuring and/or computing the direction and inclination of the bottom hole assembly and the rotational orientation of the bottom hole assembly ("tool face"). Reference can be made, for example, to U.S. Pat. No. 5,473,158. A communications transmitting portion of the downhole subsystem includes an acoustic transmitter 56, which generates an acoustic signal in the drilling fluid that is representative of the measured downhole conditions. One suitable type of acoustic transmitter, which is known in the art, employs a device known as a "mud siren" which includes a slotted stator and a slotted rotor that rotates and repeatedly interrupts the flow of drilling fluid to establish a desired acoustic wave signal in the drilling fluid. The generated acoustic mud wave travels upward in the fluid through the center of the drill string at the speed of sound in the fluid. The acoustic wave is received at the surface of the earth by transducers represented by reference numeral 31. The transducers, which are, for example, piezoelectric transducers, convert the received acoustic signals to electronic signals. The output of the transducers 31 is coupled to the uphole receiver subsystem 90 which is operative to demodulate the transmitted signals, which are then coupled to processor 85 and recorder 95.

Transmitter 56 can be controlled by conventional transmitter control and driving electronics 57 which includes analog-to-digital (A/D) circuitry that converts (if necessary) the signals representative of downhole conditions into digital form. The control and driving electronics 57 may also include a suitable modulator, such as a phase shift keying (PSK) modulator, which conventionally produces driving signals for application to the transmitter 56. These driving signals can be used to apply appropriate modulation to the mud siren of transmitter 56. It will be understood that alternative techniques can be employed for communicating logging information to the surface of the earth.

Figure 4:
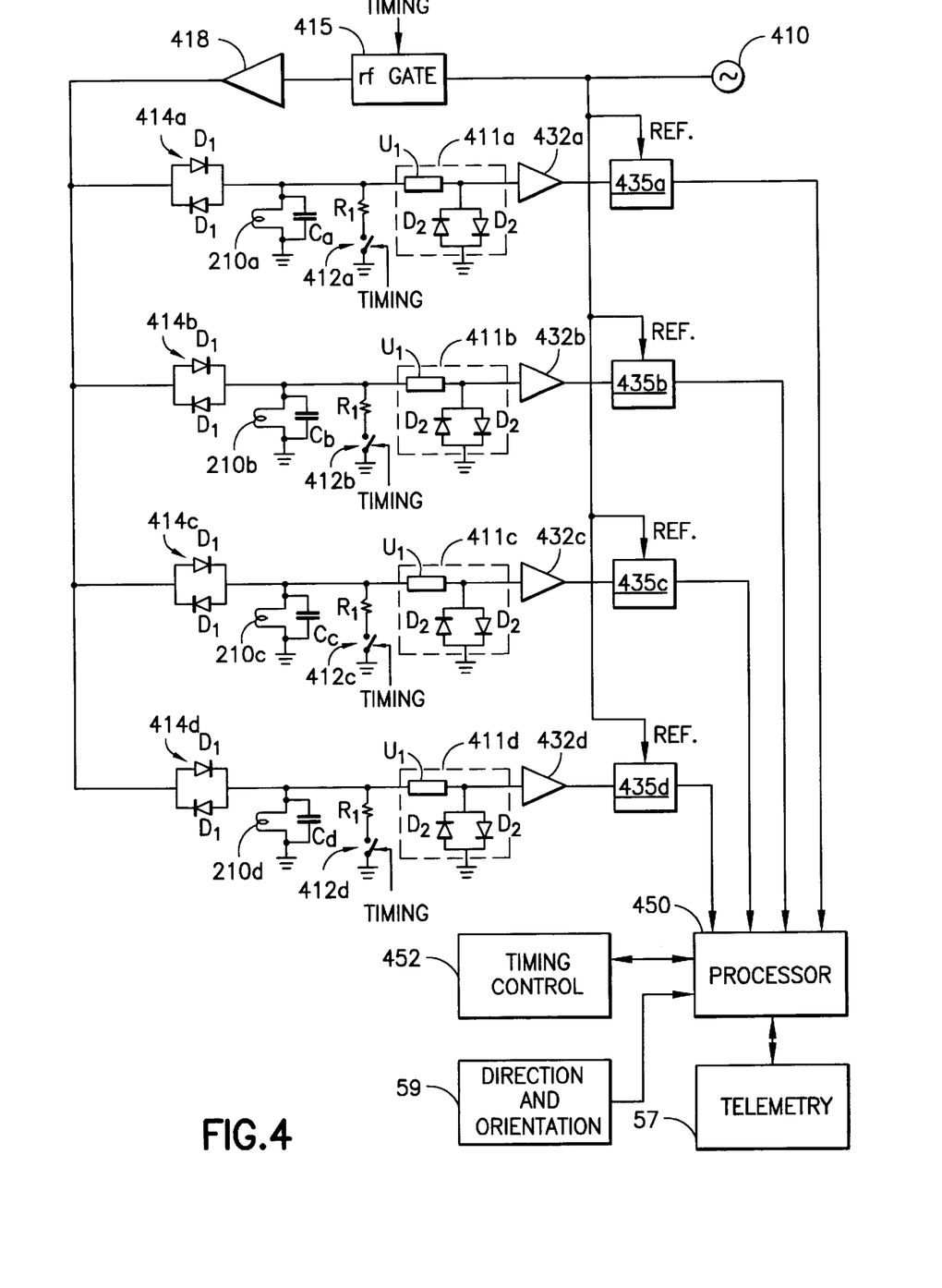
FIG. 4 is a block diagram of circuitry used in an embodiment of the invention.

The downhole subsystem 100 further includes acquisition and processor electronics 58, which can include electronics as shown in FIG. 4. The acquisition and processor electronics 58 are coupled to the measuring apparatus 200 and obtain measurement information therefrom. In known manner, the acquisition and processor electronics is capable of storing data from the measuring apparatus, processing the data and storing the results, and coupling any desired portion of the information it contains to the transmitter control and driving electronics 57 for transmission to the surface by transmitter 56. A battery 53 may provide downhole power. As known in the art, a downhole generator (not shown) such as a so-called "mud turbine" powered by the drilling fluid, can also be utilized to provide power during drilling.

If desired, the drilling equipment can be a directional drilling equipment. Such equipment (not shown) typically includes an offset (or "bent") sub, a mud motor that is driven by the flowing mud. The mud motor and bent sub can alternatively be combined in a mud motor unit upper portion of the housing and bearings in the bottom portion of the housing, with the motor drive in the upper portion of the housing and bearings in the bottom portion of the housing. The bent sub or bent housing typically has an offset or bend angle of ½ to 2 degrees. As is known in the art, when the bit is driven by the mud motor only (with the drill string stationary), the bit will deviate in a direction determined by the tool face direction in which the drill string and bent sub are oriented [so-called "sliding mode"]. When it is desired to drill substantially straight, the drill string and the mud motor are both rotated at appropriate rates [so-called "rotating mode"].

Figure 2:
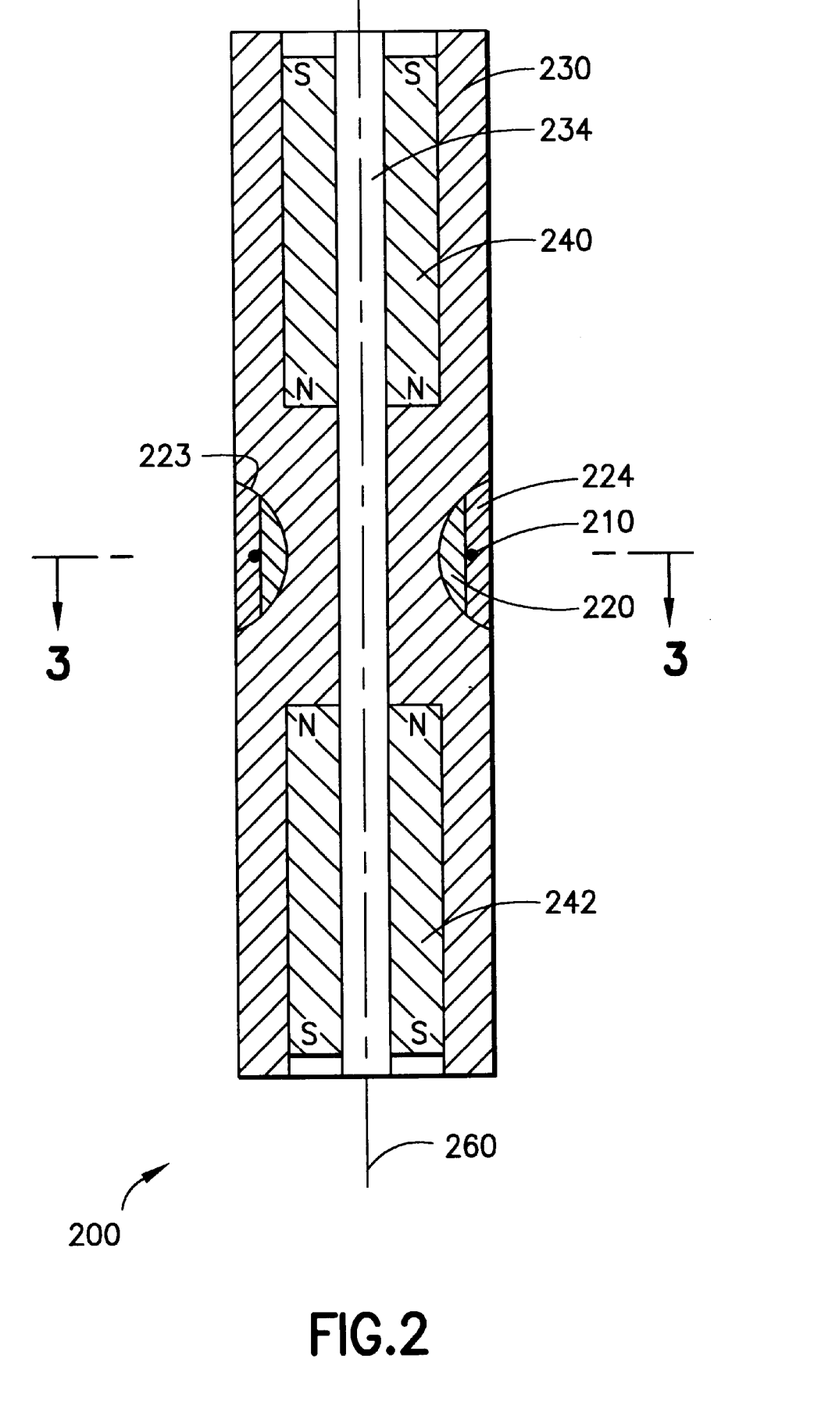
FIG. 2 is a cross-sectional view of a logging device in accordance with an embodiment of the invention and which can be used in practicing the method of the invention.

FIG. 2 illustrates an embodiment of the downhole measuring apparatus 200 (of FIG. 1) in accordance with an embodiment of the invention. The tool 200 is rotationally symmetric about axis 260 of the drill collar 230 in which the tool is constructed, and which is substantially aligned with the axis of the borehole. The static magnetic field $\overline{B}_0$ is produced by tubular, axially polarized, permanent magnets 240 and 242 mounted inside the drill collar 230. Channel 234 located inside the tool and the magnets, permits drilling mud to flow toward the drill bit. In the region between the permanent magnets, the drill collar has a circumferential recess 223 which, in the present embodiment, has an arcuate cross-section. A segmented antenna 210 is provided in the recess 223. A non-conductive material 220 is provided in the recess beneath the antenna. The material 220 is preferably a ferrite to increase the efficiency of the antenna. The antenna is protected from the abrasion and impact of the drilling environment by a shield 224, which can comprise a slotted metallic tube and/or insulating material.

Figure 3:
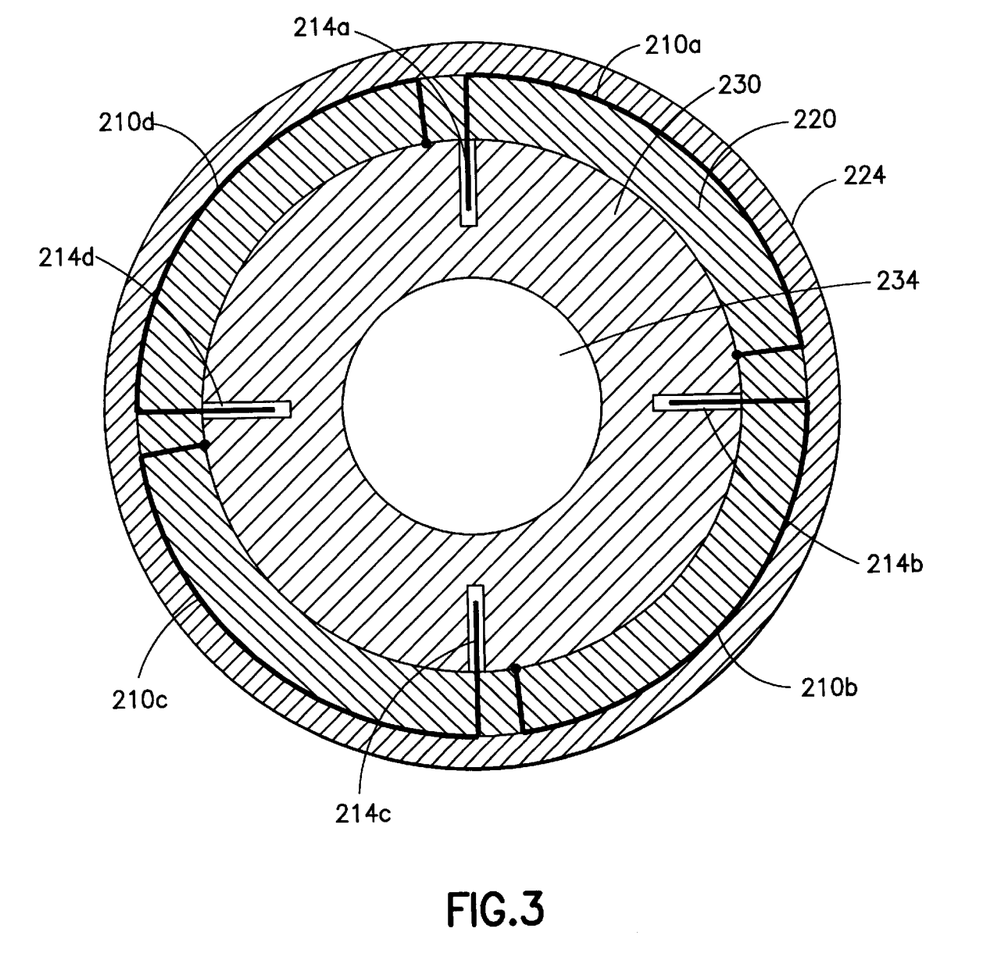
FIG. 3 is a cross-sectional view of the logging device of FIG. 2 as taken through a section defined by the arrows 3—3 of FIG. 2.

FIG. 3 is a cross-sectional view through a section of the logging device that includes the antenna 210 which, in the present embodiment, has a plurality of segments, and is used for both transmitting and receiving. In the illustrated embodiment there are four antenna segments, labelled 210a, 210b, 210c and 210d. In the illustrated embodiment, each segment is a circumferential sector that is approximately a quadrant of a one turn coil, and has one end at ground reference potential, which can be coupled with the drill collar. The other end of each coil segment passes through a respective feed-through slot (labeled 214a, 214b, 214c, and 214d), each of which runs lengthwise through the drill collar, and the respective wiring is coupled to circuitry in the module 58, which is shown in further detail in FIG. 4.

In the circuit block diagram of FIG. 4, a transmitter section includes an oscillator, represented at 410, an output of which is coupled to an rf gate 415, and then a power amplifier 418. The rf gate is under timing control of a timing block. The output of power amplifier 418 is coupled via respective extender diode circuits 414a, 414b, 414c and 414d, to the antenna segments 210a, 210b, 210c, and 210d, which are shown in FIG. 4 conjunction with respective tuning capacitances $C_a$, $C_b$, $C_c$ and $C_d$. Each of the extender diode circuits 414a, 414b, 414c and 414d includes a pair of back-to-back diodes, each designated $D_1$. Also coupled with the respective coil segments 210a, 210b, 210c and 210d are respective Q-switch circuits 412a, 412b, 412c and 412d. Each Q-switch circuit includes a critical-damping resistor $R_c$ and semiconductor switch $S_1$, for example a MOSFET. The antenna segments 210a, 210b, 210c and 210d are also coupled, via respective duplexer circuits 411a, 411b, 411c and 411d, to respective receiver circuitry that includes respective preamplifiers 432a, 432b, 432c and 432d and respective phase sensitive detectors 435a, 435b, 435c and 435d. Each of the duplexer circuits (411a–d) includes a quarter wavelength transmission line $U_1$ and a pair of back-to-back diodes, each designated $D_2$, arranged as shown. Each of the phase sensitive detectors (435a–d) receives a reference signal from the oscillator 410. The outputs of the phase sensitive detectors are coupled to a downhole processor 450, which may typically be a digital processor with associated memory and input/output circuitry (not separately shown). Timing control circuitry is associated with the processor, as represented at 452, and timing control is suitably provided as illustrated in other places in the diagram.

The processor 450 also receives an input from module 59, which includes signals representative of the rotational orientation of the downhole assembly. These signals can be used to relate the NMR signals, which are measurements with respect to the device geometry, to the formation surrounding the borehole. Alternatively, the tool 200 can be provided with a dedicated subsystem for determining tool rotational orientation and performing the necessary processing, as described in U.S. Pat. No. 5,473,158. Telemetry circuity 57 is conventionally provided for communicating with the earth's surface.

In operation, and as is known in the art, nuclear magnetic resonance circuitry can operate in three modes: transmitting, damping, and receiving. Reference can be made, for example, to U.S. Pat. Nos. 4,933,638, 5,055,787, 5,055,788, and 5,376,844. As described in the referenced patents, during the transmitting mode, the transmitter section generates relatively large rf power for a short precisely timed period, shuts off this current very quickly, within about 10 microseconds, and then isolates any signals or noise of the power circuits from coupling with detection circuitry. In the embodiment of FIGS. 2–4, transmitting and receiving are both implemented from the plurality of coil segments. Immediately after transmitting, the purpose of the Q-switches (412a–d) is to damp the rf energy in the coil as fast as possible so that the preamplifiers 432a–d can start detecting the much smaller NMR signal as soon as possible after the rf pulse. Under timing control, the switch $S_1$ is closed to achieve this purpose. Duplexer circuits 411a–d protect preamplifiers 432a–d from the rf pulses applied by power amplifier 418. It is important that duplexers 411a–d do not load the output of power amplifier 418. This is achieved by the quarter wavelength transmission line $U_1$ and the diodes $D_2$. When high power is applied, the diodes $D_2$ conduct and become almost short circuits. The quarter wavelength transmission line $U_1$ inverts the impedance of the diodes $D_2$. Therefore, the combination of the diodes $D_2$ and the quarter wavelength transmission line is seen as an open circuit by the power amplifier. During receiving, the signal is below the threshold voltage of the diodes D2, and they appear as an open circuit. Then, the respective quarter wavelength transmission lines $U_1$ connect rf coils 210a–d to preamplifiers 432a–d. The quarter wavelength lines can be implemented by any suitable means, for example by lumped capacitors and inductors, because the length of an actual quarter wave transmission line would be impracticably long, for example 375 m at 200 kHz. The diodes D1 of extender circuits 414a–d conduct only during transmission. These diodes isolate the preamplifiers 432a–d from parasitic noise and ringing that may be produced in power amplifier 418.

As above indicated, the antenna segments 210a–d are collectively used as a transmitter coil and then, during reception, as receiver segments that provide reception at different circumferential sectors on the logging device.

When all segments of the coil are energized in parallel, the resulting B1 field is substantially invariant with respect to rotation angle. There will be some deviation from rotational symmetry in the vicinity of the coil segments, but further away from the coils, such as in the investigation region, the field will have substantially rotational symmetry.

Figure 5:
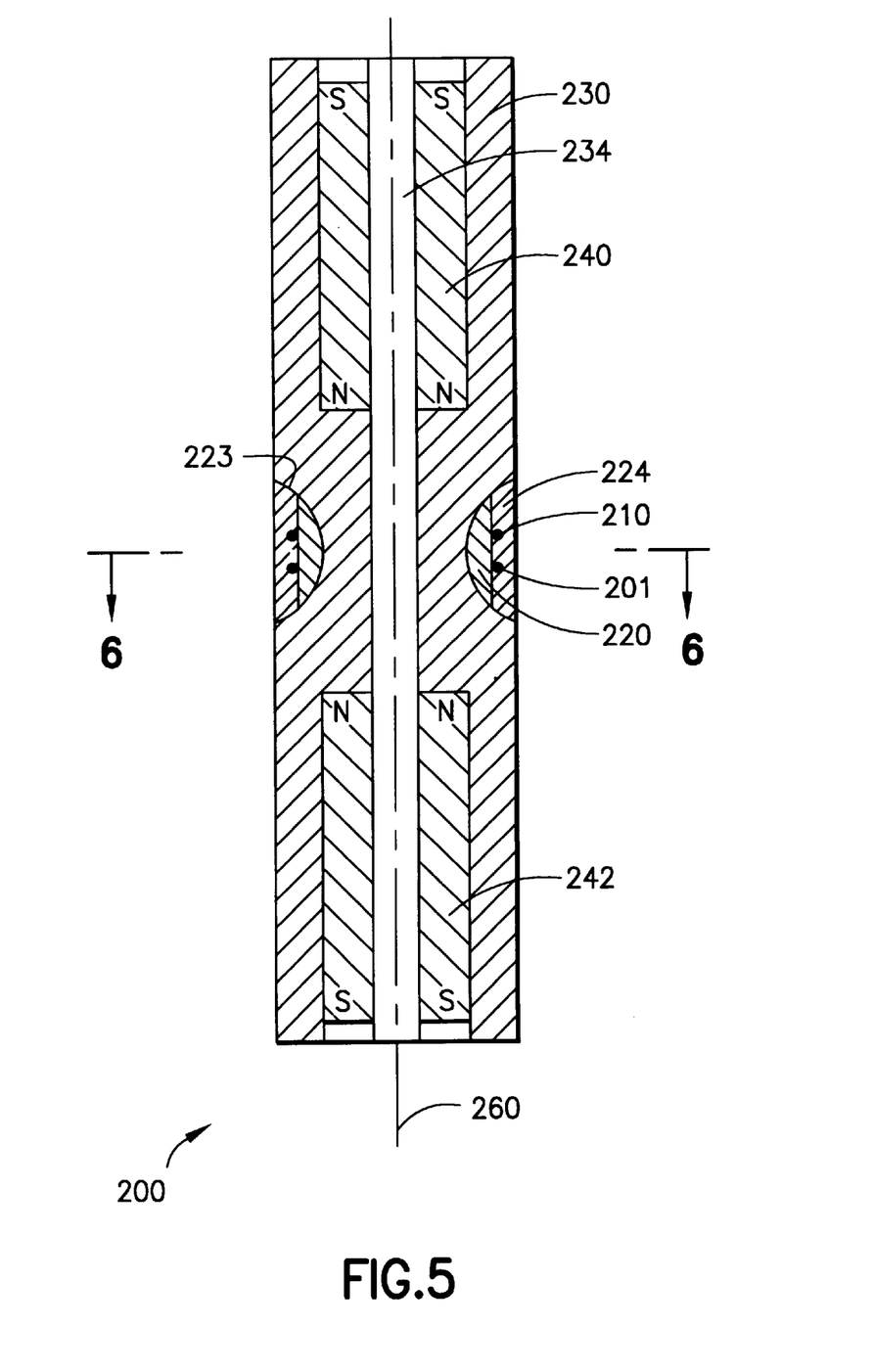
FIG. 5 is a cross-sectional view of a logging device in accordance with another embodiment of the invention and which can be used in practicing the method of the invention.
Figure 6:
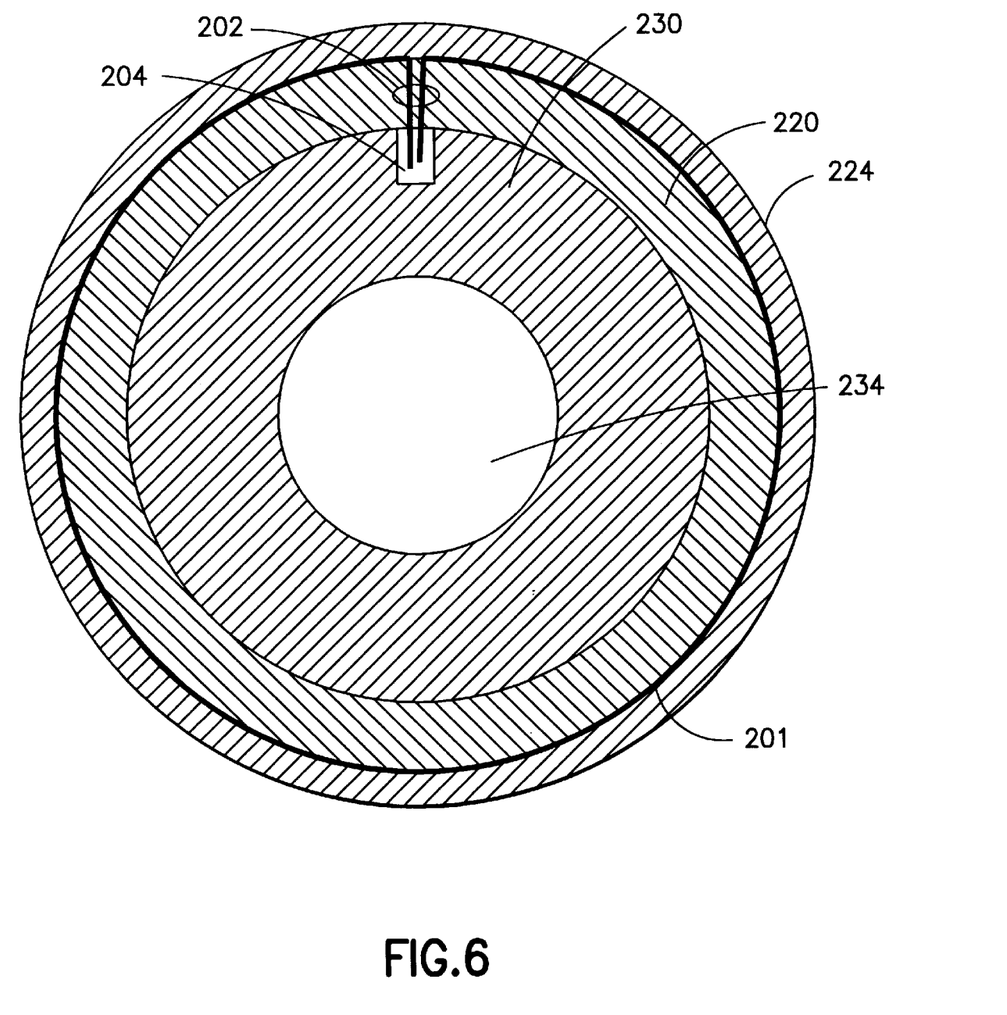
FIG. 6 is a cross-sectional view of the logging device of FIG. 5 as taken through a section defined by the arrows 6—6 of FIG. 5.
Figure 7:
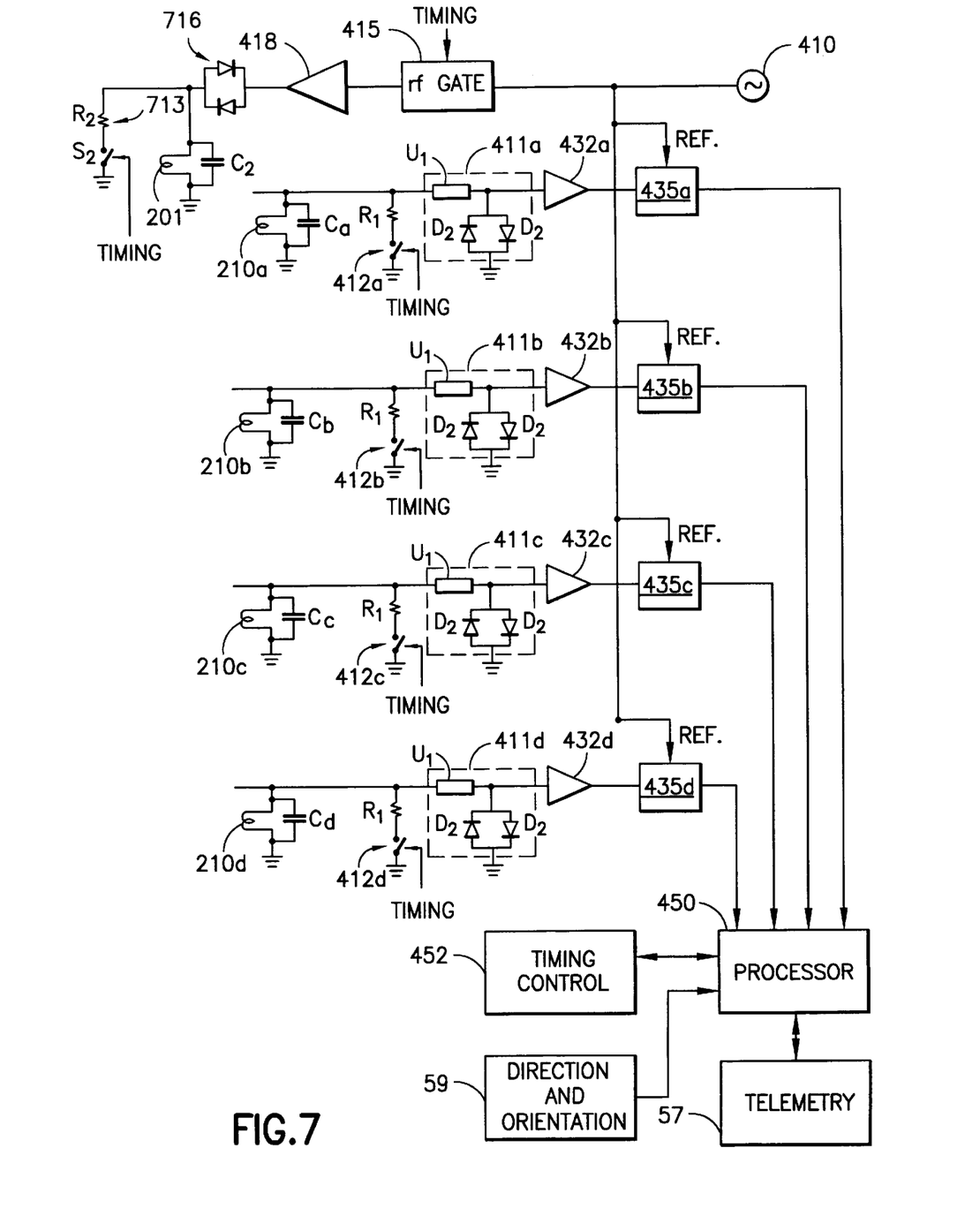
FIG. 7 is a block diagram of circuitry used in an embodiment of the invention.

FIGS. 5, 6 and 7 illustrates a further embodiment wherein the receiver coil comprises the coil segments previously described (and represented by reference numeral 210 in FIG. 5, and reference numerals 210a, 210b, 210c and 210d in FIG. 7). FIG. 5 shows the downhole measuring apparatus, with similar components to those of FIG. 2 represented by like reference numerals. This embodiment includes a separate transmitting antenna 201 spaced from the segmented coil 210. The transmitter coil 201 is axisymmetric in construction and produces an axisymmetric rf magnetic field.

FIG. 6 is a cross-sectional view through a section of the logging device that includes the transmitting antenna 201. In this embodiment, the transmitting antenna is an axially symmetric single turn coil, although plural turns may be used. The wiring leads 202 for energizing the coil 201 pass through the insulating medium 220 to a feed-through slot 204 in the drill collar 230 that runs lengthwise along the drill collar, parallel to the axis thereof, to the circuitry in the module 58. The wiring in this and other feed-throughs is insulated.

FIG. 7 is a block diagram of an embodiment of the circuitry in the module 58 for use in conjunction with the antennas of FIG. 5, 6 embodiment. Portions of the circuitry are similar to those of the FIG. 4 embodiment and are represented by like reference numerals. In this embodiment the transmitter circuitry again includes oscillator 410, rf gate 415, and power amplifier 418, and the transmitter coil 201 (shown in parallel with tuning capacitor $C_2$) is driven via extender diode circuit 716 and has associated Q-switch 713 that comprises switch $S_2$ and critical damping resistor $R_2$. The rest of the circuitry is similar to its counterpart in FIG. 4.

Figure 8:
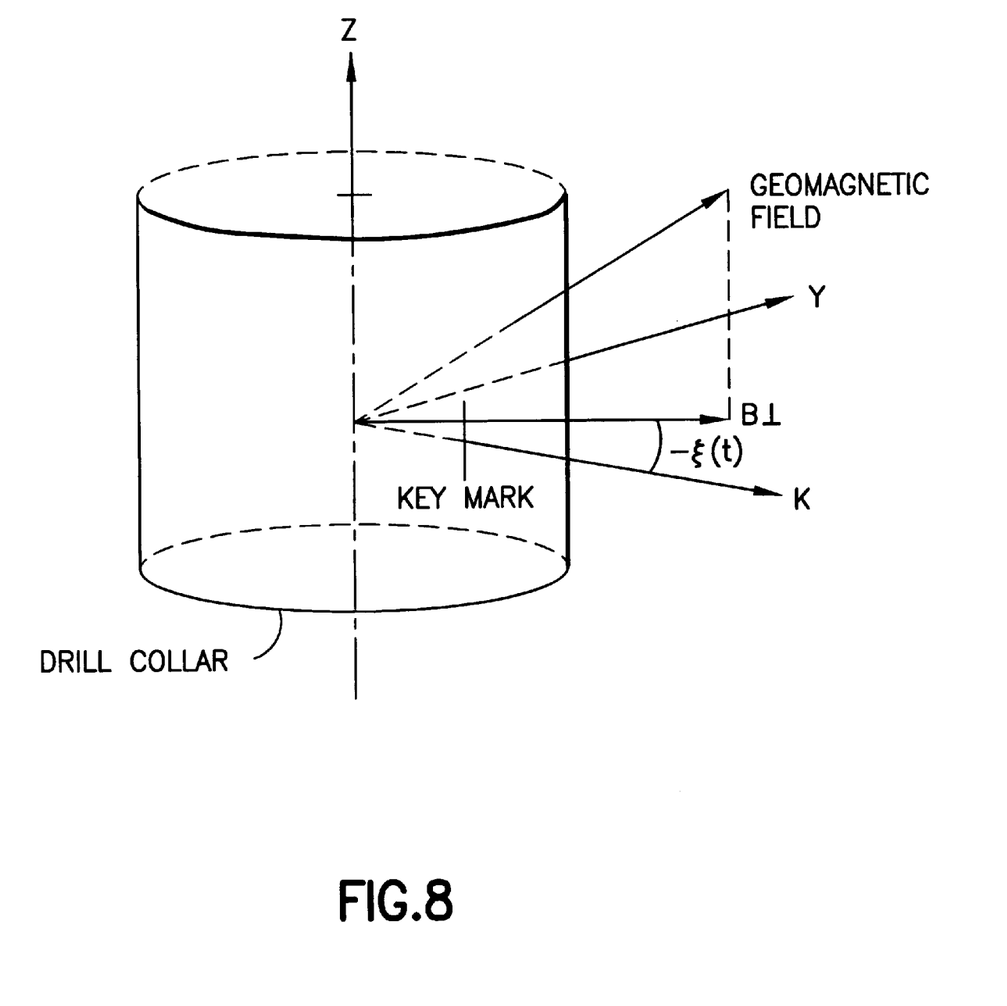
FIG. 8 is a simplified diagram of directions and orientations in the borehole that is useful in understanding an aspect of the invention.

The following analysis illustrates how the signals received from the different circumferential sectors can be used in conjunction with information from the direction and orientation module 59 (e.g. FIGS. 1, 4, and 7) in determining properties of different portions (e.g. different circumferential portions) of the investigation region. In the simplified diagram of FIG. 8, the axis of the drill collar is designated as the z axis. The axis z is not necessarily vertical but it is substantially in the direction of drilling. Assume that a key mark is scribed axially on the outer surface of the drill collar. This mark serves as a reference for measurement of azimuth angle around the tool (tool rotational orientation). The axis x is perpendicular to the axis z and it points radially from the axis of the drill collar to the key mark as shown in FIG. 8. The axis y is orthogonal to the axes x and z. The axes x, y, z define an orthogonal reference frame that rotates together with the tool. Magnetometers Mx and My are mounted in the drill collar so that their sensitive axes are x and y, respectively. Similarly, accelerometers Ax and Ay are mounted so that their sensitive axes are x and y, respectively. The magnetic and gravitational fields of the Earth define two azimuth directions that are fixed with respect to the Earth. Let B⊥ be the component of the geomagnetic field that is perpendicular to the axis z of the drill collar. Similarly, let G⊥ be the component of the gravitational field that is perpendicular to the axis z of the drill collar. B⊥ points South and G⊥ points down. Either one of these directions can be used as the reference for azimuth that is fixed with respect to the earth formation. The preferred reference is the magnetic one as the measurement of acceleration can be confused by the drilling vibration since acceleration and gravitational attraction are fundamentally indistinguishable. A limitation of the described technique for determining rotational orientation is when the axis z of the drill collar, the geomagnetic field, and the gravitational field are all aligned with each other. In such case, there is a lack of an azimuth reference that is fixed with respect to the earth. This could happen, for example, in vertical wells close to the North or South Pole. The azimuth of the key mark with respect to B⊥ is ξ=atan2(−My,Mx) where atan2 is the 4-quadrant inverse tangent function defined, for example, in standard FORTRAN or C manuals. Similarly, the azimuth of the key mark with respect to G⊥ is ζ=atan2(−Ay,Ax). Both of the angles ξ and ζ are time dependent when the drill string is rotating. Assume there are N receiver coils labeled n=1, 2 . . . N centered at azimuths 2πn/N on the drill collar, measured with respect to the key mark. The following components of the tool are physically aligned in azimuth: the sensitive axis of the accelerometer Ax, the sensitive axis of the magnetometer Mx, the key mark, and the center of the receiver coil N. All of these rotate together. The normalized sensitivity function of receiver n is: f(φ−2πn/N) where φ is the azimuth angle measured with respect to the key mark on the drill collar. This function can by obtained by using a radially oriented sheet-like specimen and measuring the signal amplitude as a function of the azimuth of the radially oriented specimen. The function f is by definition periodic with period 2π. Ideally, the sensitivity functions of the receivers is a partition of unity of design, i.e.:

$$1 = \sum_{n=1}^{N} f(\phi - 2n\pi/N) \qquad (1)$$

This ensures that the receivers collectively do not have blind zones in azimuth. Since the actual sensitivity functions are smoothly varying functions of azimuth, the receivers necessarily have overlapping sensitive zones to satisfy the partition of unity. If equation (1) is not satisfied, a linear combination of the outputs of the receivers can be formed so that the linear combinations are as close as possible to a partition of unity. For a spin-echo that occurs at time instant t, the output of receiver n can be called e(t,n). Let ψ be the azimuth angle measured with respect to the direction B⊥ in the Earth. The function E(t,ψ) is the azimuthally resolved signal at time t:

$$E(t, \psi) = \sum_{n=1}^{N} e(t, n) f(\psi - \xi(t) - 2n\pi/N) \qquad (2)$$

The formula (2) gives a sequence of echoes E(t,ψ) for each azimuth ψ. For each azimuth ψ, these echoes can be analyzed in the usual fashion as described, for example, in U.S. Pat. Nos. 5,363,041 and 5,389,877. In two ways, formula (2) is in agreement with common sense: First, in the event that all receivers have the same output, i.e., e(t,1)=e(t,2)= . . . =e(t,N), by partition of unity, the azimuthally resolved output E(t,ψ) becomes independent of the azimuth angle and equal to e(t,n) for any n. Second, suppose the sensitivity functions f were perfectly sharp; that is, each receiver were equally sensitive to a range of azimuth values and had no sensitivity outside this range:

$$f(\phi) = 1 \text{ if } -\pi/N < \phi \le +\pi/N. \qquad (3)$$
$$= 0 \text{ otherwise}$$

This assumption is not realistic because magnetic fields in the formation cannot have sharp transitions. In reality, f is a bell-shaped curve. Therefore, the azimuthal resolution is not sharp. Nevertheless, the idealization (3) above leads to a useful thought experiment. In this case, $E(t,\psi)$ would be equal to the output of one of the receivers: $E(t,\psi)=e(t,n)$, where n is such that $\xi(t)+(2n-1)\pi/N<\psi\le\xi(t)+(2n+1)\pi/N$. That is, the part of the formation that is in the $\pm\pi/N$ azimuthal neighborhood of receiver coil n at the time instant t, would be assigned the reading e(t,n). This is the intended action. The sensitivity function f is actually a smoothly varying, bell-shaped curve. Therefore, the results will vary smoothly as a function of azimuth. The azimuthal resolution will be on the order of the width of the bell-shaped curve $f(\phi)$, which is about $2\pi/N$.

Figure 9:
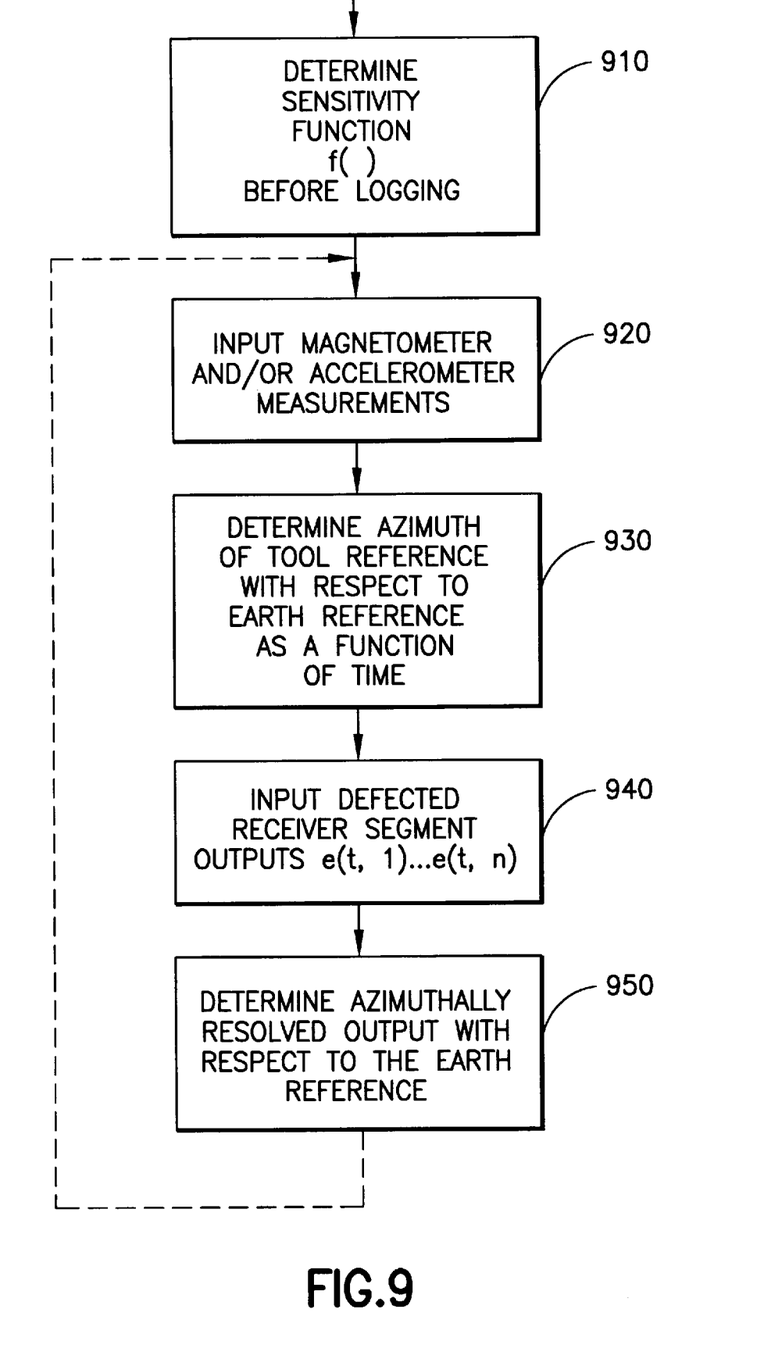
FIG. 9 is a flow diagram of a routine that can be used for programming a processor in accordance with an embodiment of the invention.

FIG. 9 is a flow diagram of a routine for controlling the processor 450, or other processor, to implement the processing to obtain azimuthally resolved NMR measurements with respect to an earth reference. The block 910 represents the determination of the sensitivity function f( ) which, as previously described, can be performed before logging. The magnetometer and/or accelerometer measurements are input, as represented by the block 920. The azimuth of tool reference, with respect to earth reference, can then be determined as a function of time using the formulas $\xi$=atan2(-My,Mx) or $\zeta$=atan2(-Ay,Ax) described above, this being represented by the block 930. The detected receiver segment outputs e(t,1), e(t,2), . . . e(t,n) are input (block 940). Then, using equation (2), the azimuthally resolved output, with respect to the earth reference, can be determined, as represented by the block 950. For processing at further depths or time references, the block 920 is re-entered.

Figure 10:
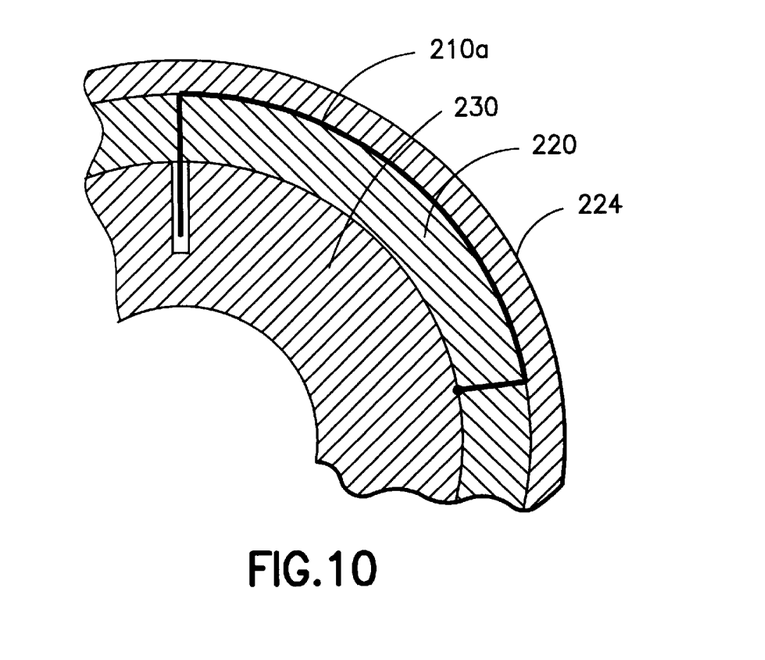
FIG. 10 is a cross-sectional partially broken away view of a receiving antenna on a logging device, in accordance with a further embodiment of the invention and which can be used in practicing the method of the invention.

In an above illustrated embodiment, there are four receiver coil segments, e.g. the coil segments 210a, 210b, 210c and 210d of FIGS. 3, 4, 5 and 6. One or a plurality of such segments can be utilized in receiving spin echo signals from a portion of the investigation region. When the logging device rotates, the rotating antenna segment or segments can provide azimuthally resolved NMR properties of the full 360 degree span of the surrounding formations. It will be understood that there are trade-offs between resolution, signal strength, complexity and cost, when selecting the number and configuration of antennas. In the embodiment of FIG. 10, a single receiving antenna 210a (which may be, for example, one of the quadrant receiver antennas of the FIGS. 5, 6 embodiment, which has a separate transmitting antenna 201) is shown and is mounted in the previously described manner. The Figure also shows drill collar 230, nonconductive material 220, and shield 224 which covers antenna 210a. The circuitry of FIG. 7 that is coupled with transmitting antenna 201 and receiving antenna 210a can be used in conjunction with this embodiment.

Figure 11:
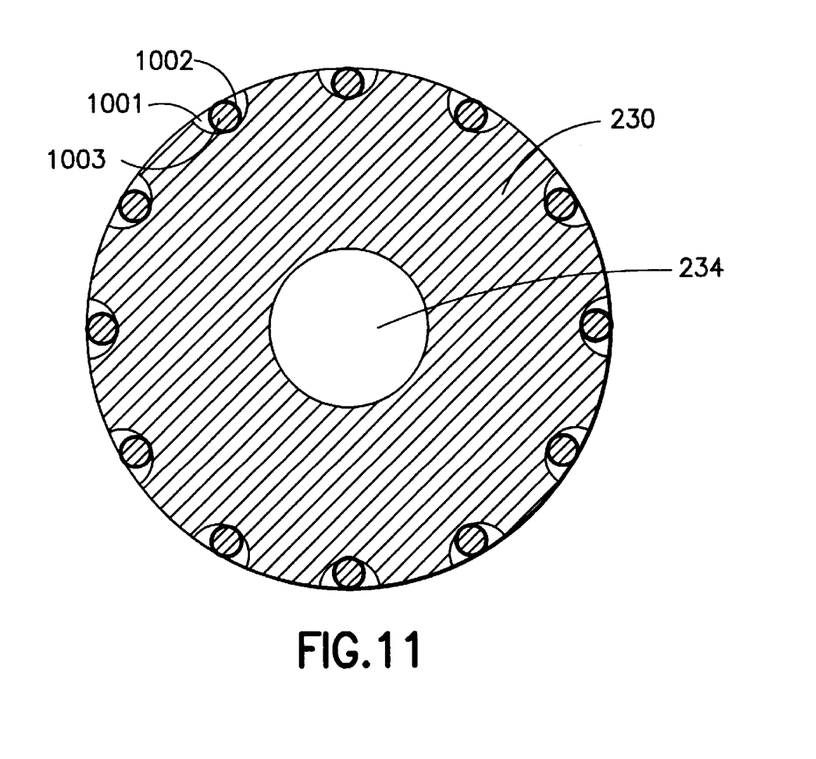
FIG. 11 is a cross-sectional view of a logging device in accordance with another embodiment of the invention, and which can be used in practicing the method of the invention.

FIG. 11 illustrates an embodiment of a logging device 200 (e.g. in FIG. 1) in accordance with a further form of the invention. In this embodiment, a plurality of receiver coil components 1002 are located in a respective plurality of axially oriented slots 1001 machined on the external surface of the drill collar 230. At least three such coils are preferred, with four or more being more preferred RF coils 1002 are wound on ferrite rods 1003. The axes of the ferrite rods 1003, the axes of the slots 1001, and the axis of the drill collar are all oriented in the same direction. The rf coils 1002 are covered by a nonmagnetic and insulating material such as ceramic, plastic, or rubber. Each coil is connected to the acquisition and processing electronics, which can be similar to that previously described in conjunction with FIG. 4, via a respective feed-through (as in FIG. 3). The rotationally symmetric transmitter field is produced by driving all coils in parallel. The transmitted field is rotationally symmetric at radial distances that are larger than the separation of the coils 1002. This embodiment leads to a relatively sturdy mechanical design, but generally with less receiver sensitivity than the prior embodiments.

We claim:

1. A method for determining a nuclear magnetic resonance property of formations surrounding a borehole while drilling the borehole with a rotating drill bit on a drill string, comprising the steps of:

providing a logging device in the drill string, said logging device being rotatable with the drill string or a portion of the drill string, said logging device having a rotational axis;

producing a static magnetic field and an RF magnetic field at said logging device, said static and RF magnetic fields having mutually orthogonal components in an investigation region in the formations surrounding said logging device, the magnitudes of said static and RF magnetic fields in said investigation region being substantially rotationally invariant as said logging device rotates around its axis;

receiving nuclear magnetic resonance spin echoes at at least one circumferential sector on said logging device; and determining a nuclear magnetic resonance property of said formations, for different portions of said investigation region, from said received nuclear magnetic resonance spin echoes.

2. The method as defined by claim 1, wherein said producing of an RF magnetic field comprises providing a coil wound around said logging device.

3. The method as defined by claim 1, wherein said receiving of nuclear magnetic resonance spin echoes at at least one circumferential sector on said logging device comprises providing at least one arcuate antenna segment on said logging device, and detecting nuclear magnetic resonance spin echoes in signals received by said at least one antenna segment.

4. The method as defined by claim 2, wherein said receiving of nuclear magnetic resonance spin echoes at at least one circumferential sector on said logging device comprises providing at least one arcuate antenna segment on said logging device, and detecting nuclear magnetic resonance spin echoes in signals received by said at least one antenna segment.

5. The method as defined by claim 1, wherein said receiving of nuclear magnetic resonance spin echoes at at least one circumferential sector on said logging device comprises providing a plurality of arcuate receiver segments around said logging device, and detecting nuclear magnetic resonance spin echoes in signals received by said receiver segments.

6. The method as defined by claim 2, wherein said receiving of nuclear magnetic resonance spin echoes at at least one circumferential sector on said logging device comprises providing a plurality of arcuate receiver segments around said logging device, and detecting nuclear magnetic resonance spin echoes in signals received by said receiver segments.

7. The method as defined by claim 5, wherein said producing of an RF magnetic field comprises energizing said plurality of arcuate antenna segments as transmitters.

8. The method as defined by claim 7, wherein said arcuate antenna segments are energized in parallel.

9. The method as defined by claim 1, wherein said at least one circumferential sector comprises a plurality of circumferential sectors.

10. The method as defined by claim 2, wherein said at least one circumferential sector comprises a plurality of circumferential sectors.

11. The method as defined by claim 5, wherein said plurality of arcuate antenna segments comprises four arcuate segments, each of said segments being substantially a quadrant of the circumference of said logging device.

12. The method as defined by claim 5, wherein said plurality of arcuate antenna segments comprises four arcuate segments, each of said segments being substantially a quadrant of the circumference of said logging device.

13. The method as defined by claim 1, further comprising the step of determining the rotational orientation of said logging device, and wherein said step of determining a nuclear magnetic resonance property comprises determining said property from said nuclear magnetic resonance spin echoes and said rotational orientation determination.

14. The method as defined by claim 5, further comprising the step of determining the rotational orientation of said logging device, and wherein said step of determining a nuclear magnetic resonance property comprises determining said property from said nuclear magnetic resonance spin echoes and said rotational orientation determination.

15. The method as defined by claim 13, wherein said step of determining the rotational orientation of said logging device comprises determining, as a function of time, the rotational orientation of the downhole assembly near the drill bit.

16. The method as defined by claim 1, wherein said different portions of said investigation region comprise different circumferential sectors of said investigation region.

17. The method as defined by claim 5, wherein said different portions of said investigation region comprise different circumferential quadrants of said investigation region.

18. The method as defined by claim 9, wherein said receiving of nuclear magnetic resonance spin echoes at a plurality of different circumferential sectors on said logging device comprises providing a plurality of axially aligned antennas circumferentially spaced around said logging device, and detecting nuclear magnetic resonance spin echoes in signals received by said antennas.

19. A method for determining a nuclear magnetic resonance property of formations surrounding a borehole, comprising the steps of:
providing a logging device moveable through the borehole, said logging device having an axis;
producing a static magnetic field and an RF magnetic field at said logging device, said static and RF magnetic fields having mutually orthogonal components in an investigation region in the formations surrounding said logging device, the magnitudes of said static and RF magnetic fields in said investigation region being substantially rotationally invariant for different rotational orientations of said logging device;
receiving nuclear magnetic resonance spin echoes at at least one circumferential sector on said logging device; and
determining a nuclear magnetic resonance property of said formations, for different portions of said investigation region, from said received nuclear magnetic resonance spin echoes.

20. The method as defined by claim 19, wherein said producing of an RF magnetic field comprises providing a coil wound around said logging device.

21. The method as defined by claim 19, wherein said receiving of nuclear magnetic resonance spin echoes at at least one circumferential sector on said logging device comprises providing at least one arcuate antenna segment on said logging device, and detecting nuclear magnetic resonance spin echoes in signals received by said at least one antenna segment.

22. The method as defined by claim 20, wherein said receiving of nuclear magnetic resonance spin echoes at at least one circumferential sector on said logging device comprises providing at least one arcuate antenna segment on said logging device, and detecting nuclear magnetic resonance spin echoes in signals received by said at least one antenna segment.

23. The method as defined by claim 19, wherein said receiving of nuclear magnetic resonance spin echoes at at least one different circumferential sector on said logging device comprises providing a plurality of arcuate receiver segments around said logging device, and detecting nuclear magnetic resonance spin echoes in signals received by said receiver segments.

24. The method as defined by claim 20, wherein said receiving of nuclear magnetic resonance spin echoes at at least one different circumferential sector on said logging device comprises providing a plurality of arcuate receiver segments around said logging device, and detecting nuclear magnetic resonance spin echoes in signals received by said receiver segments.

25. The method as defined by claim 23, wherein said producing of an RF magnetic field comprises energizing said plurality of antenna segments as transmitters.

26. The method as defined by claim 25, wherein said antenna segments are energized in parallel.

27. The method as defined by claim 23, wherein said at least one circumferential sector comprises a plurality of circumferential sectors.

28. The method as defined by claim 23, wherein said plurality of arcuate antenna segments comprises four arcuate segments, each of said segments being substantially a quadrant of the circumference of said logging device.

29. The method as defined by claim 24, wherein said plurality of arcuate antenna segments comprises four arcuate segments, each of said segments being substantially a quadrant of the circumference of said logging device.

30. The method as defined by claim 19, further comprising the step of determining the rotational orientation of said logging device, and wherein said step of determining a nuclear magnetic resonance property comprises determining said property from said nuclear magnetic resonance spin echoes and said rotational orientation determination.

31. The method as defined by claim 23, further comprising the step of determining the rotational orientation of said logging device, and wherein said step of determining a nuclear magnetic resonance property comprises determining said property from said nuclear magnetic resonance spin echoes and said rotational orientation determination.

32. The method as defined by claim 30, wherein said receiving of nuclear magnetic resonance spin echoes at a plurality of different circumferential sectors on said logging device comprises providing a plurality of axially aligned antennas circumferentially spaced around said logging device, and detecting nuclear magnetic resonance spin echoes in signals received by said antennas.

33. Apparatus for determining a nuclear magnetic resonance property of formations surrounding a borehole, comprising:

a logging device moveable through the borehole, said logging device having an axis;

means in said logging device for producing a static magnetic field;

means in said logging device for producing an RF magnetic field;

said static and RF magnetic fields having mutually orthogonal components in an investigation region in the formations surrounding said logging device, the magnitudes of said static and RF magnetic fields in said investigation region being substantially rotationally invariant around the axis of said logging device;

means for receiving nuclear magnetic resonance spin echoes at at least one circumferential sector on said logging device; and means for determining a nuclear magnetic resonance property of said formations, for different portions of said investigation region, from said received nuclear magnetic resonance spin echoes.

34. Apparatus as defined by claim 33, wherein said means for producing an RF magnetic field comprises a coil wound around said logging device.

35. Apparatus as defined by claim 33, wherein said means for receiving nuclear magnetic resonance spin echoes at at least one circumferential sector on said logging device comprises at least one arcuate antenna segment on said logging device, and means for detecting nuclear magnetic resonance spin echoes in signals received by said at least one antenna segment.

36. Apparatus as defined by claim 33, wherein said means for receiving nuclear magnetic resonance spin echoes at at least one circumferential sector on said logging device comprises a plurality of arcuate receiver segments around said logging device, and means for detecting nuclear magnetic resonance spin echoes in signals received by said receiver segments.

37. Apparatus as defined by claim 36, wherein said plurality of arcuate antenna segments comprises four arcuate segments, each of said segments being substantially a quadrant of the circumference of said logging device.

38. Apparatus as defined by claim 36, wherein said means for producing said RF magnetic field comprises means for energizing said plurality of arcuate antenna segments as transmitters.

39. Apparatus as defined by claim 33, wherein said different portions of said investigation region comprise different circumferential sectors of said investigation region.

40. Apparatus as defined by claim 37, wherein said different portions of said investigation region comprise different circumferential quadrants of said investigation region.

41. Apparatus as defined by claim 33, further comprising means for determining the rotational orientation of said logging device, and wherein said means for determining a nuclear magnetic resonance property of said formations is also responsive to the determined rotational orientation of said logging device.

42. Apparatus as defined by claim 33, wherein said means for receiving nuclear magnetic resonance spin echoes at at least one circumferential sector on said logging device comprises a plurality of axially aligned antennas circumferentially spaced around said logging device, and means for detecting nuclear magnetic resonance spin echoes in signals received by said antennas.

43. Apparatus for determining a nuclear magnetic resonance property of formations surrounding a borehole while drilling the borehole with a rotating drill bit on a drill string, comprising:

a logging device in the drill string, said logging device being rotatable with the drill string or a portion of the drill string, said logging device having a rotational axis;

means for producing a static magnetic field and an RF magnetic field at said logging device, said static and RF magnetic fields having mutually orthogonal components in an investigation region in the formations surrounding said logging device, the magnitudes of said static and RF magnetic fields in said investigation region being substantially rotationally invariant as said logging device rotates around its axis;

means for receiving nuclear magnetic resonance spin echoes at at least one circumferential sector on said logging device; and means for determining a nuclear magnetic resonance property of said formations, for different portions of said investigation region, from said received nuclear magnetic resonance spin echoes.

44. Apparatus as defined by claim 43, wherein said means for producing an RF magnetic field comprises a coil wound around said logging device.

45. Apparatus as defined by claim 43, wherein said means for receiving nuclear magnetic resonance spin echoes at at least one circumferential sector on said logging device comprises at least one arcuate antenna segment on said logging device, and means for detecting nuclear magnetic resonance spin echoes in signals received by said at least one antenna segment.

46. Apparatus as defined by claim 45, wherein said at least one circumferential sector comprises a plurality of circumferential sectors, and wherein said at least one arcuate antenna segment comprises a plurality of arcuate antenna segments.

47. Apparatus as defined by claim 46, wherein said means for producing said RF magnetic field comprises means for energizing said plurality of arcuate antenna segments as transmitters.

48. Apparatus as defined by claim 46, wherein said plurality of arcuate receiver segments comprises four arcuate segments, each of said segments being substantially a quadrant of the circumference of said logging device.

49. Apparatus as defined by claim 43, further comprising means for determining the rotational orientation of said logging device, and wherein said means for determining a nuclear magnetic resonance property comprises means for determining said property from said nuclear magnetic resonance spin echoes and said rotational orientation determination.

50. Apparatus as defined by claim 49, wherein said means for determining the rotational orientation of said logging device comprises means for determining, as a function of time, the rotational orientation of the downhole assembly near the drill bit.

51. Apparatus as defined by claim 43, wherein said means for receiving nuclear magnetic resonance spin echoes at at least one circumferential sector on said logging device comprises a plurality of axially aligned antennas circumferentially spaced around said logging device, and means for detecting nuclear magnetic resonance spin echoes in signals received by said antennas.

* * * * *